Feb. 13, 1968 — J. E. LAUBACH — 3,368,961

ELECTROCHEMICAL CELL

Filed April 20, 1964

INVENTOR:
JAMES E. LAUBACH
BY Margall, Johnston
Cook & Root
ATT'YS

United States Patent Office 3,368,961
Patented Feb. 13, 1968

3,368,961
ELECTROCHEMICAL CELL
James E. Laubach, Lake Jackson, Tex., assignor to Nalco Chemical Company, Chicago, Ill., a corporation of Delaware
Filed Apr. 20, 1964, Ser. No. 361,039
8 Claims. (Cl. 204—269)

ABSTRACT OF THE DISCLOSURE

An electrochemical cell having a plurality of tubular electrodes between aligned apertures in end plates at opposite ends and having hollow end closure members at opposite ends, said tubular electrodes comprising a sacrificial anode material which can be introduced into one of said hollow end members and is supported in the other, is provided with flanged tubular insulating sleeves that extend into the hollow portion of said last named end closure member, thereby preventing short circuiting.

---

Figure 1:
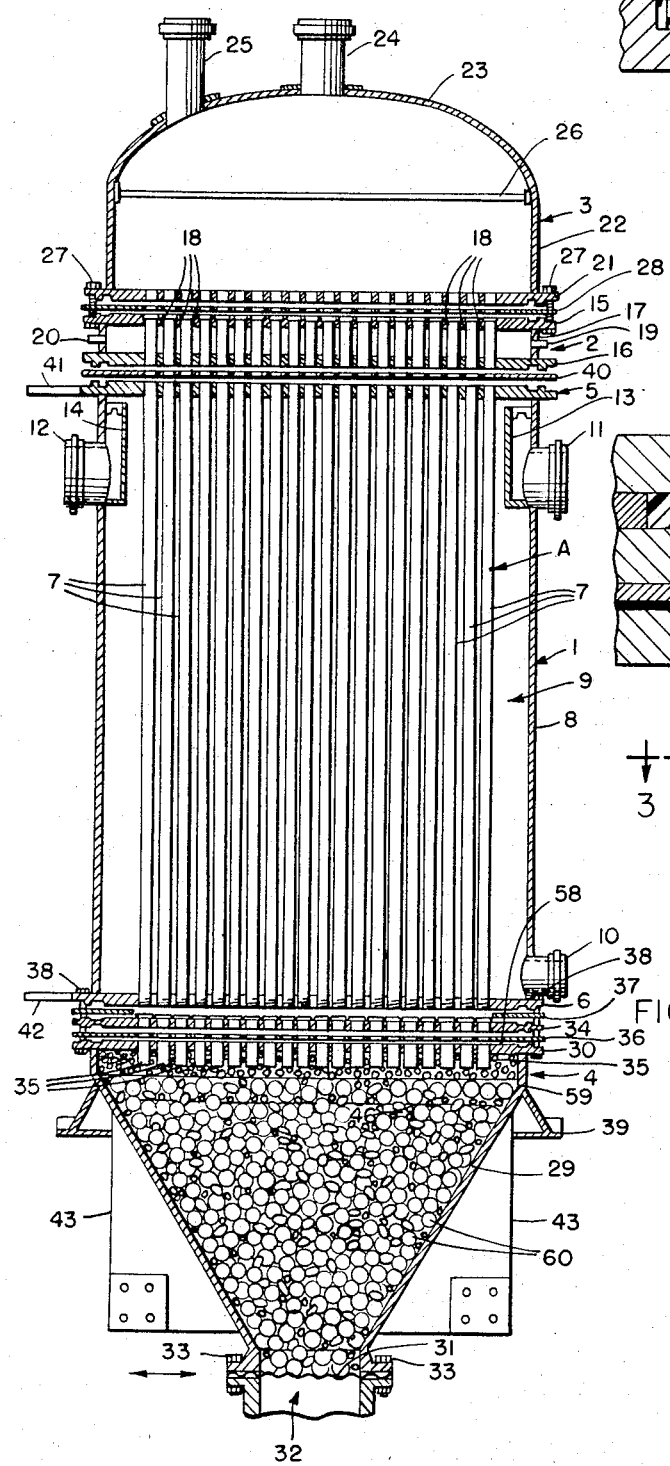

This invention relates to an electrochemical cell which can be used for electrolyzing a liquid electrolyte, using a sacrificial anode. The invention is especially concerned with a new and improved electrochemical cell containing lead in particulate form as the anode, which is employed for the manufacture of tetraalkyl lead compounds, including, for example, tetramethyl lead, tetraethyl lead, triethylmonomethyl lead, diethyldimethyl lead, monoethyltrimethyl lead, and mixtures thereof, and which is useful for the manufacture of other organic metallic compounds by electrolyzing a solution of a Grignard reagent, using a sacrificial anode.

The term "sacrificial anode" refers to an anode which is eroded or dissolved during the eelctrolytic process.

The invention contemplates an improvement in an electrochemical cell having a hollow main shell with end plates at opposite ends, said plates having aligned apertures therein, a plurality of individual tubular electrodes in said main shell each having opposite ends disposed in said apertures, each of said tubular electrodes comprising an anode and a cathode, hollow end closure members at opposite ends of said main shell, means connecting the anodes of said tubular electrodes to a source of positive potential through one of said end closure members, means connecting the cathodes of said tubular electrodes to a source of negative potential through said main shell, and means electrically insulating said end closure members from said main shell.

One way of constructing a cell of this type is to insert a foraminous partition member or a plurality of such members in each of the individual tubes in the main shell in such a way that the foraminous partition member or members lie closely adjacent the inner walls of such tubes, leaving a tubular space surrounded by said foraminous partition member or members. This tubular space is then filled with particles or pellets of the anode material and the latter extend in the form of a column or columns into one of the end closure members through which a source of positive electrical potential is applied. The partition member or members contain holes or openings which are large enough to permit the passage of an electrolyte through the anode particles and the partition member or members into contact with the inner surface of the tubular cathode but small enough to keep the particles themselves from contacting the inner surface of the cathode. The partition member or members themselves do not conduct electricity and therefore serve to electrically insulate the cathode from the anode particles.

In a cell construction of the type described, one problem which arises is the proper insulation of the main shell which is connected to a source of negative potential from the hollow end closure member which is connected to a source of positive potential. If the electrical insulation between the end plate of the main shell and the end plate of the hollow end closure member adjacent thereto is defective arcing can occur which will result in damage to the cell. One way of providing insulation is to separate the end plate of the main shell from the end plate of the hollow end closure member by a separate plate having apertures therein in alignment with the apertures of the tubular electrodes and insulating said separate plate from the end plate of the main shell and the end plate of the hollow end closure member by means of electrically insulating washers having the same hole pattern as said end plates. While this type of cell structure operates satisfactorily in most cases, it is still possible for anode particles to migrate from the end closure into the insulating means between the end plate of the end closure and the end plate of the main shell, thereby causing a short circuit.

One of the objects of the present invention is to provide a cell of the type described in which the electrical insulation between the end plate of one of said hollow end closure members and the end plate of the main shell is improved.

A further object of the invention is to provide an improved electrically insulating structure of the type described in which anode particles are prevented from migrating into the area between the end plate of the hollow end closure member and the end plate of the main shell in such a way as to cause a short circuit.

A more specific object of the invention is to provide in a cell of the type described a structure comprising flanged tubular sleeves which are electrically insulating and are mounted with the bore of each of their tubular portions in alignment with each of the apertures of one of the end plates at one end of the hollow main shell and with the flanges of said members between said end plate and the adjacent end of one of said hollow end closure members, the tubular portions of said tubular insulating sleeves extending into the hollow portions of said last named end closure member.

Figure 2:
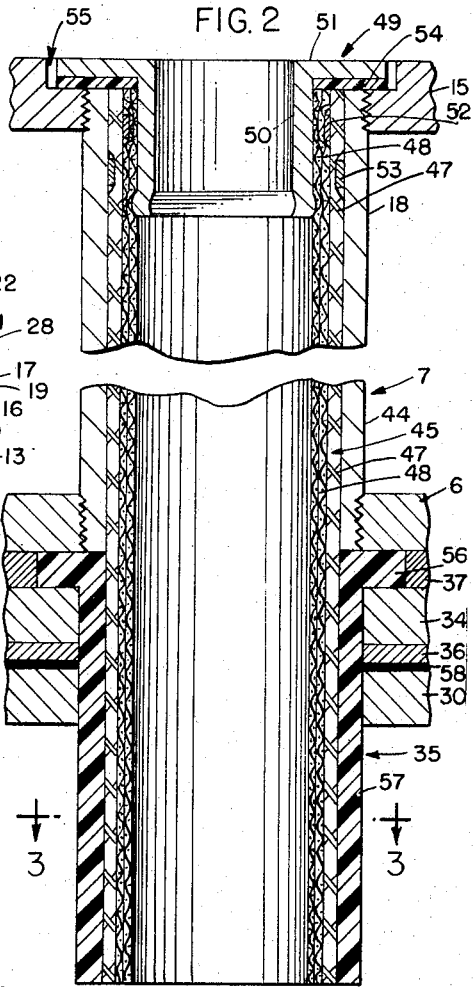
Figure 3:
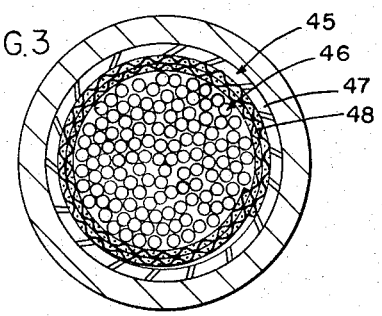

Other objects and advantages of the invention will appear from the following description in conjunction with the accompanying drawings in which FIGURE 1 is an elevational sectional view of a cell provided in accordance with the invention;

FIGURE 2 is an enlarged sectional view, with parts broken away, of one of the electrodes of the cell taken at A of FIGURE 1; and FIGURE 3 is a plan sectional view taken along the line 3—3 of FIGURE 2.

In general, the cell illustrated in the drawings comprises a hollow main shell with end plates at opposite ends, said plates having aligned apertures therein, a plurality of individual tubular electrodes in said main shell, each having opposite ends disposed in said apertures, each of said tubular electrodes comprising an anode and a cathode, hollow end closure members at opposite ends of said main shell, means connecting the anodes of said tubular electrodes to a source of positive potential through one of said end closure members, means connecting the cathodes of said tubular electrodes to a source of negative potential through said main shell, and means electrically insulating said end closure members from said main shell. In accordance with the present invention the last named means comprises a structure in which electrically insulating flanged tubular sleeves are mounted with the bore thereof in alignment with each of the apertures of one of said end plates at one end of said hollow main shell and with the flanges of said sleeves between said end plate and the adjacent end of one of said hollow end closure members and with the tubular portions of said tubular insulating sleeves extending into the hollow portion of said end closure member.

It is usually preferable to mount the flanged tubular sleeves in the holes of a separate plate which is disposed between the end plate of the main shell and the end plate of the hollow closure member and wherein said holes are aligned with the holes in the end plate of the main shell and the holes in the end plate of the hollow closure member. It is also desirable to provide an electrically insulating gasket in the form of an annular ring outside of the hole area between the end plate of the main shell and said intermediate plate in which said flanged tubular sleeves are mounted. Additionally it is desirable to provide a separate electrically insulating gasket between said intermediate plate in which said flanged tubular sleeves are mounted and the end plate of the hollow end closure, this gasket having the same hole pattern as the intermediate plate and the end plate of the hollow end closure.

In order to provide additional insulation, it is desirable to coat the end plate of the hollow end closure adjacent the last named electrically insulating gasket with an electrically insulating coating, such as, for example, a resinous material which does not conduct electricity. It is also desirable to apply an electrically insulating coating to the inside of the hollow end closure in the area adjacent the end plate of said hollow end closure.

In the drawings, the general cell structure shown in FIGURE 1 comprises a main shell 1, a second shell 2, a top end closure member 3, and a bottom end closure member 4. The main shell 1 is provided with an upper end plate 5 and a lower end plate 6. Each of the end plates 5 and 6 is substantially circular in cross section and is provided with aligned openings or apertures. Metal tubes 7, which are preferably constructed of steel, are welded or otherwise secured in the apertures of the plates 5 and 6. The number of these tubes will vary, of course, depending upon the size of the main shell 1 and the desired capacity of the unit. The cylindrical outer shell 8 is welded or otherwise secured in liquid-tight relationship to the end plates 5 and 6. Likewise, the metal tubes 7 are welded or otherwise secured in liquid-tight relationship to the same end plates so as to form a chamber 9 around the metal tubes 7 into which a heat exchange liquid is introduced through an inlet opening 10 and removed or recirculated through outlets 11 and 12 which are provided with baffles 13 and 14, respectively.

The second shell 2 consists of two end plates 15 and 16 having apertures therein corresponding to the apertures in the end plates 5 and 6 of the main shell 1. A circular sheet metal housing 17 is welded or otherwise secured to the end plates 15 and 16 of the second shell 2 to form a liquid-tight enclosure. Short tubes 18, preferably made of steel and corresponding in diameter to the tubes 7, are welded or otherwise secured in liquid-tight engagement in the apertures of the plates 15 and 16 of the second shell 2. Openings 19 and 20 are provided as inlet or outlet openings to introduce or remove heat exchange fluid, if desired, or for the purpose of drawing condensate from the interior of the second shell 2.

The top end closure 3 consists of a base plate 21 having apertures therein. These apertures correspond in size and are aligned with the apertures in plates 5, 6, 15 and 16. A hollow metal shell 22 is welded or otherwise secured in liquid-tight engagement to the base plate 21. At the top 23 of the shell 22 is an inlet 24 where anode material, such as lead particles, can be charged and also an opening 25 where the electrolyte can be introduced or withdrawn. A metal reinforcing band 26 is welded to the inside of the shell 22.

The top closure member 23 is assembled with the cell by means of bolts 27 extending through bolt holes in the flanges 21 and 15. An insulating sheet 28 is placed between the end plates 15 and 21 thereby electrically insulating the end closure 3 from the second shell 2. The second shell 2 is similarly bolted to the main shell 1 by means of bolts, not shown, passing through holes in the outer ends of plates 5 and 16. An insulating gasket 40 is placed between the plates 5 and 16, thereby electrically insulating the second shell 2 from the main shell 1.

At the bottom of the cell the end closure 4 consists of a generally conical shaped housing 29, provided at the top with an end plate 30 which is welded or otherwise secured in liquid-tight engagement to the housing 29 and has apertures therein with the same hole pattern as the apertures in the plates 5, 6, 15, 16 and 21. A closure member 31 is placed over the opening 32 in the bottom of hollow end member 4 and is held in place by means of bolts 33, or in any other suitable manner. The member 31 consists of a screen or other similar structure which is capable of holding a solid material contained in hollow end member 4 but at the same time is pervious and permits the flow of electrolyte. The structure of this member and of that portion of the apparatus where this member is located does not form a part of this invention. When it is desired to clean the cell, the member 31 can be removed by removing the bolts 33.

A circular flat plate 34 is disposed between end plate 6 of the member shell 1 and end plate 30 of the hollow end closure member 4. The plate 34 has the same hole pattern as the tubes 7.

In each of the holes in the plate 34 there is mounted a flanged tubular sleeve 35 which is preferably molded from an electrically insulating resinous material, such as, for example, high impact polyethylene. Each of the flanged tubular sleeves 35 extends through an opening in circular plate 34, thence through an opening in an electrically insulating gasket 36 having the same hole pattern as the end plates 6 and 30, and thence through a corresponding opening in the end plate 30 of end closure hollow member 4. The lower end of each of the sleeves 35 preferably projects a substantial distance into the top of hollow end closure member 4 as shown in FIGURE 1. An electrically insulating sealing gasket 37 is disposed between end plate 6 of main shell 1 and the circular plate 34 but the gasket 37 is only a ring and does not extend into the hole area.

The bottom closure member 4 is assembled in liquid tight engagement to the main shell 1 by means of bolts 38 passing through holes in the outer edges of end plates 6 and 30, circular plate 34 and gaskets 36 and 37. The cell is supported from a supporting structure 39 which is suitably mounted to provide a firm base.

The insulating gaskets 28, 40, 36 and 37 are made of a suitable electrically non-conducting material, such as polyethylene, polypropylene or a polymer of tetrafluoroethylene (Teflon). All of these gaskets, except the gasket 37, contain an aperture pattern in alignment with the bores of the tubes 7 and 18 and also the apertures of end plates 5, 6, 15, 16, 21 and 30 and the flat plate 34.

Extensions 41 and 42 are welded or otherwise secured to the end plates 5 and 6, respectively, and are connected to a negative source of electrical potential, that is, a source of negative direct current suitable for the operation of the cell. It is desirable to employ a number of these extensions secured to the end plates 5 and 6 at equally spaced distances. For example, in a cell of the type described in the drawings, eight such extensions are preferred.

The hollow end closure member 4 contains downwardly extending triangularly shaped portions 43 which are welded or otherwise connected to the shell 29 and serve as connections to a positive source of electrical potential. Again, it is preferable to employ a plurality of these anode connections equally spaced from one another and in a cell of the type described eight such extensions would be used.

As shown in FIGURES 2 and 3, each of the tubular electrodes 7 comprises an outer metal tube 44, a foraminous partition generally indicated at 45 and an anode material, for example, spherical lead particles, generally indicated at 46. The foraminous partition 45 consists of a tubular electrically non-conducting material 47, the outer surface of which is in direct contact with the inner surface of the metal tube 44 and a second tubular electrically non-conducting material 48 which is disposed concentrically within the tubular material 47, the inner surface of which is in contact with anode material 46.

The inner tubular material 48 is preferably a woven filamentary material composed of glass filaments, polyamide (nylon) filaments, or polypropylene filaments, in a foraminous form with openings small enough to prevent the passage of the anode material but large enough to permit the flow of a liquid electrolyte. In a preferred embodiment a double wrap of nylon cloth is used having a 92 x 92 thread count and a 1/1 plain weave. The threads in this case are made from nylon monofilaments and the double wrap is so arranged that the ends wrapped together overlap each other by about one-half inch.

The tubular member 47 is also foraminous and has openings therein. This member can have various forms and preferably consists of a network of filaments made of polypropylene or other suitable electrically non-conducting material. The particular structure of the foraminous partition members 47 and 48 does not constitute a part of this invention.

As shown in FIGURE 2, the foraminous partition 45 is placed inside of each of the tubular electrodes 7 by first assembling it on a short flanged tube 49. This tube 49 has a tubular portion 50 and a flanged portion 51. The foraminous member 48 is placed around the short tubular portion 50 and is held in place by means of a clamping ring 52 which can be made of metal or plastic or any other suitable material. The foraminous member 47 is then placed around the foraminous member 48 and held in place by means of a clamping ring 53, all as shown at the top of FIGURE 2. A sealing gasket or washer 54 is placed between the flanged portion 51 and the end plate 15 of the second shell 2. The end plate 15 is also provided with a recessed area 55 to accommodate the flange 51 of the short flanged tube 49.

In the manner described, the foraminous partitions 47 and 48 are suspended from the plate 15 and extend downwardly through openings in plate 16, insulating gasket 40, plate 5 and end plate 6. At this point a special type of electrically insulating structure is provided which is shown in detail in the lower part of FIGURE 2. This structure consists of the flanged tubular sleeve 35. The flanged portion 56 is preferably about one-quarter inch thick and when the flanged tubular sleeve is inserted through an opening in circular plate 34 the lower part of the flange 56 engages the top surface of circular plate 34. The tubular sleeve portion extends downwardly through an opening in electrically insulating gasket 36 and an opening in end plate 30 of hollow end closure member 4. The wall thickness of the tubular sleeve portion 57 may vary but is usually about half that of the flange portion 56. The tubular sleeve portion 57 is preferably long enough to extend a substantial distance into hollow end closure member 4—say five or six inches. The foraminous partition members 47 and 48 extend downwardly inside of the flanged tubular sleeve 35 in the manner shown in FIGURE 2. The weight of the anode material 46 presses outwardly and downwardly against the foraminous partition members 47 and 48 thereby holding them in place. At the same time the combination of the foraminous partition members and the flanged tubular sleeves provides excellent electrical insulation and reduces the possibility of arcing and short circuiting that might otherwise exist. In order to supplement the electrical insulation, an electrically insulating coating 58 is placed on top of the end plate 30 of hollow end closure member 4 and a second coating 59 is applied around the upper part of the inner surface of the shell 29. This coating preferably extends downwardly from the plate 30 a distance of about twelve inches. Raschig rings 60 are placed in the conical shell 29 to increase the electrical conductivity. The anode particles 46 are dispersed throughout these rings and intermingled therewith.

The anode material which is introduced through the inlet 24 fills the interior spaces of all of the tubular electrodes as well as the entire space except that occupied by the Raschig rings in the conical closure member 4. An excess of the anode material is also maintained in the hollow portion of the upper closure member 3 so that as the anode material is consumed by the electrolyzing action additional quantities drop downwardly into the electrolyzing tubes 7. The anode material provides its own electrical contact with the Raschig rings and the walls of member 4 which in turn are connected through the connecting members 43 to a source of positive electrical potential. The electrolyzing action occurs in the main shell 1 in the space between the end plates 5 and 6. The electrolyte is preferably flowed downwardly from the opening 25 through the opening 32 and is recirculated continuously by means of a pump and external piping system, not shown. If desired, the electrolyte can be flowed upwardly through opening 32 and outwardly through opening 25. Any suitable heat exchange liquid can be introduced through opening 10 and withdrawn through openings 11 and 12 or vice versa in order to control the temperature in the cell. The coating materials applied to form coatings 58 and 59 can be any suitable electrically non-conducting materials, such as resins which are substantially inert under the conditions of cell operation. A suitable resin, for example, is an epoxy resin. A specific example of a suitable resin is the resin obtained by curing a mixture of epichlorhydrin epoxidized dihydroxydiphenyldimethylmethane having an epoxide equivalent of 175 to 210 (Epon 828) cured with 15% by weight monohydroxypropyldiethylenetriamine.

The invention provides a simple and effective way of insulating an electrochemical cell of the type described. The component parts of the cell and of the insulating means can be manufactured with relative ease and are not difficult to assemble or disassemble.

The invention is hereby claimed as follows:

1. In an electrochemical cell having a hollow main shell with end plates at opposite ends, said plates having aligned apertures therein, a plurality of individual tubular electrodes in said main shell each having opposite ends disposed in said apertures, each of said tubular electrodes comprising a sacrificial anode and a cathode, hollow end closure members at opposite ends of said main shell, means connecting the anodes of said tubular electrodes to a source of positive electrical potential through one of said end closure members, means connecting the cathodes of said tubular electrodes to a source of negative electrical potential through said main shell, and means electrically insulating said end closure members from said main shell, a structure comprising flanged tubular sleeves which are electrically insulating mounted with the bore of each of their tubular portions in alignment with each of the apertures of one of said end plates at one end of said hollow main shell and with the flanges of said sleeves between said end plate and the adjacent end of one of said hollow end closure members, the tubular portions of said tubular insulating sleeves extending into the hollow portion of said last named end closure member.

2. A cell as claimed in claim 1 in which said tubular sleeves are formed from a molded resin.

3. A cell as claimed in claim 1 in which said tubular sleeves are made from polyethylene.

4. A cell as claimed in claim 1 in which each of said tubular electrodes is lined with a foraminous partition which extends into said tubular sleeves.

5. A cell as claimed in claim 1 in which each of said tubular electrodes is lined with a foraminous partition which extends into said tubular sleeves, said tubular sleeves extending into said hollow end closure, said hollow end closure containing electrically conducting pieces which are not sacrificial anode materials, and sacrificial anode material in particulate form filling said tubular electrodes, said tubular sleeves and the spaces between said electrically conducting pieces in said hollow end closure.

6. In an electrochemical cell having a hollow main shell with an end plate at one end, said plate having apertures therein, a plurality of individual tubular electrodes in said main shell each having an end disposed in one of said apertures, each of said tubular electrodes comprising a sacrificial anode and a cathode, a hollow end closure member at said end of said main shell containing said end plate, said hollow end closure member also having an end plate with an aperture pattern corresponding to the aperture pattern in said end plate of said main shell, means connecting the anodes of said tubular electrodes to a source of positive electrical potential through said hollow end closure member, means connecting the cathodes of said tubular electrodes to a source of negative electrical potential through said main shell, and means electrically insulating said end closure member from said main shell, a structure comprising flanged tubular sleeves which are electrically insulating in alignment with each of the apertures of said end plate of said main shell and with said flanges of said sleeves between said end plate of said main shell and said end plate of said hollow end closure member, the tubular portions of said tubular insulating sleeves extending into the apertures of said hollow end closure member.

7. A cell as claimed in claim 6, wherein said tubular sleeves are mounted with their tubular portions inserted in apertures in a flat plate member and with the underside of their flange portions contacting the upper side of said plate member, said plate member having an aperture pattern corresponding to the aperture pattern in said end plate of said main shell and said end plate of said hollow closure member and being electrically insulated from said main shell and said hollow closure member.

8. In a cell as claimed in claim 6, an electrically insulating coating on the upper surface of said end plate of said hollow end closure member and an electrically insulating coating on the inner surface of the upper part of said hollow end closure member.

References Cited

UNITED STATES PATENTS

| 3,141,841 | 7/1964 | Braithwaite et al. | 204—263 |
| 3,180,810 | 4/1965 | Pearce et al. | 204—59 |
| 3,287,248 | 11/1966 | Braithwaite | 204—260 |
| 3,287,249 | 11/1966 | Braithwaite et al. | 204—260 |

FOREIGN PATENTS

| 638,649 | 3/1962 | Canada. |
| 512,277 | 11/1930 | Germany. |

HOWARD S. WILLIAMS, *Primary Examiner.*

JOHN H. MACK, *Examiner.*

D. R. JORDAN, *Assistant Examiner.*